United States Patent [19]

Weston

[11] Patent Number: 4,995,990

[45] Date of Patent: Feb. 26, 1991

[54] AIR AND WATER DISTRIBUTION CONDUIT

[75] Inventor: Philip A. Weston, Newbury, Great Britain

[73] Assignee: PWT Projects Limited, Great Britain

[21] Appl. No.: 334,716

[22] Filed: Apr. 6, 1989

[30] Foreign Application Priority Data

Apr. 7, 1988 [GB] United Kingdom ............... 8808133

[51] Int. Cl.$^5$ ............................................. B01D 29/62
[52] U.S. Cl. ................................. 210/793; 210/279; 210/288; 55/476; 55/DIG. 32; 261/23.1
[58] Field of Search ............... 210/791, 792, 793, 794, 210/153, 269, 275, 279, 288, 289, 293, 274, 291; 55/98, 474, 476, DIG. 32; 261/19, 23.1

[56] References Cited

U.S. PATENT DOCUMENTS

| 1,069,737 | 8/1913 | Stevenson | 210/794 |
| 2,767,852 | 10/1956 | Ellila | 210/171 |
| 3,954,620 | 5/1976 | Nebolsine | 210/275 |
| 4,707,257 | 11/1987 | Davis et al. | 210/275 |
| 4,753,726 | 6/1988 | Suchanek | 210/279 |

FOREIGN PATENT DOCUMENTS

| 689443 | 3/1940 | Fed. Rep. of Germany . |
| 736915 | 5/1943 | Fed. Rep. of Germany . |
| 1470610 | 1/1967 | France . |
| 304967 | 1/1929 | United Kingdom . |
| 2002251 | 2/1979 | United Kingdom . |

Primary Examiner—Robert A. Dawson
Assistant Examiner—Wanda L. Millard
Attorney, Agent, or Firm—Ostrolenk, Faber, Gerb & Soffen

[57] ABSTRACT

A granular media filter has an underdrain system for use in a granular media filter comprising perforated lateral conduits arranged for the distribution of air and water for scouring and backwashing of the filter. Each conduit is in the form of a single linear conduit containing two or more separate axially parallel ducts, each duct having an external wall in common with the conduit, which wall is provided with axially spaced apertures for emission of water or air, there being no intercommunication between the ducts. The underdrain system itself also forms a feature of the invention.

9 Claims, 1 Drawing Sheet

AIR AND WATER DISTRIBUTION CONDUIT

This invention relates to granular media filters and to an improved system of air scouring and water backwasing. In particular, the invention relates to the use of special conduit for the air and water.

Granular media filters are commonly provided with an underdrain system comprising perforated lateral pipes connected to a header pipe or duct. Large filters constructed in concrete are provided with an extensive array of such lateral pipes. The function of the underdrain system is to collect the filtrates and, more importantly, to distribute the backwash water used for cleaning.

It is common practice to apply air as well as water during backwashing, either before or concurrently with the water wash. While it is relatively easy to design a system which will provide a uniform distribution of air and water from a single lateral pipe grid when the air and water are applied separately, it is much more difficult to do so if the phases are applied concurrently. Under those circumstances friction and Bernoulli effects prevent a smooth air-water interface from being established in all but the very shortest length of lateral pipe. In order to overcome this problem it is necessary to provide the suspended floors with a deep plenum when combined air scour and water backwashing are required.

Various proposals have been made to replace the single pipe by a two-compartment pipe. Thus, for example, GB No. 2 002 251A discloses a multi-channelled duct having a first central passageway and, on either side of the passageway, second and third passageways communicating with the passageway via apertures. The passageways and communicate with the exterior via openings. The ducts are laid in an array in the lower zone of a filter basin beneath a gravel layer and layer of filter material. During filtration, dirty water or the like is passed through the layers and collected in the passageways from where it flows to a conduit. To back wash the layer of filter material, water is supplied to the passageway and flows from there through the openings and through the apertures and openings. To scour the filter basin with air, air is supplied to the first passageway and it flows from there through the openings but not the passageways as the level of the water in the passageway, when air is supplied to the passageway, is above the apertures. However, as air and water are admitted simultaneously, an unstable interface is again formed.

GB Patent No. 304 967 discloses a two-duct pipe in which a lower duct, for water, is connected to the top of the pipe via an internal venturi tube passing through a superimposed upper duct for air. Air is drawn into the venturi by the water flowing and mixes therewith. This type of system is obviously difficult to adjust, since the air-water ratio obtained depends on each venturi. The system could not, therefore, be built into the floor of a filter.

An alternative system for a combined air and water wash is to employ two separate distribution systems which are dedicated respectively to air and to water. This is a reliable and robust solution to the problem, but it involves the additional costs of the extra materials, the supports and the erection labour.

There is thus a need for a simple, cheaper system which will efficiently distribute air and water.

According to the present invention we provide a granular media filter including an underdrain system comprising perforated lateral conduits arranged for the distribution of air and water either separately or concurrently for scouring and backwashing of the filter, each conduit being in the form a single linear conduit containing two or more separate axially parallel ducts separated by one or more internal wall(s), characterised in that each duct has an external wall in common with the conduit, which external wall is provided with axially spaced apertures for emission of water or air, and in that in each conduit at least one duct is arranged for the distribution of air and at least one duct is arranged for the distribution of water, there being no intercommunication between the ducts.

In its simplest form the conduit comprises two ducts running side by side or one on top of the other with a common dividing wall between them. However, it is possible for extra ducts to be present, for example so that the ratio of air to water can be adjusted. The apertures can comprise simple bored holes or more elaborate nozzles or jets. The apertures may by provided with strainer means, although it is important that when strainer means are present, the main point of pressure loss in the water or air should be at the point of emergence from the duct and not from the strainer into the filter medium.

The apertures in each duct wall will be suitably spaced depending on the degree of backwash and sparging required. Apertures for water may be at different spacings than apertures for air, or alternatively the apertures may be grouped in pairs if water and air are required at the same point. Similarly, the size of the apertures will vary, and in general apertures for air will be of smaller diameter than apertures for water.

The conduit is conveniently extruded in a one piece form, for example by extrusion moulding of a suitable plastic, such as uPVC, ABS etc. Alternatively, metal extrusions can be considered. Other methods of manufacture are obviously available, including folding and welding of metal sheet. In general, extruded plastic is most preferred, for its ease of manufacture and its lightness.

The cross-section of the conduit may be any convenient shape, depending on the layout of the filter and the direction from which air and water are provided. Conveniently, the conduit is of round or rectangular section. In a particularly preferred embodiment the conduit is of generally round section, and contains two superimposed ducts of generally semicircular section separated by a horizontal dividing wall or septum. In such an embodiment, the apertures are located on the top and bottom of the conduit (i.e. on an axis perpendicular to the septum).

If air is applied to a duct in which all the holes are at the same level, then water which inevitably fills the duct between backwash operations can only be displaced down to the level of the holes and, because of surface tension effects around small holes at the same level, not all the holes may discharge. (A typical 3 mm meniscus height is the same dimension as the holes typically used in such distribution systems). For example, where all the holes are on the crown of the duct there will be considerable instability and at the end orifice where there is no ongoing air velocity, air discharge will commence only with difficulty.

Likewise in the configuration shown in British Patent No. 304967 the downcoming venturi tubes all terminate at the same level. Surface tension together with any unevenness in the manifold and any headloss along the air manifold will cause the bottom of some stems to remain submerged and not discharge air particularly when air is to be discharged on its own in the absence of a water flow as is normally the case at the start up of the backwash process.

It is therefore a further feature of this invention that one or two or more secondary apertures are provided in the air duct at a lower level that the previously mentioned axially spaced apertures so that the water which fills the duct whilst out of action may be substantially emptied from it when the air is applied and that the residual water level is taken well below the service orifices. Alternatively, said axially spaced apertures are located in an upper position on at least one of the ducts and each of said apertures is projected downwards into the duct as an inwardly extending duct.

By way of example, various embodiments of the invention are now described with reference to FIGS. 1 to 5 in the accompanying drawings, in which.

The underdrain system for a granular media filter comprises a horizontal array of conduits located at the bottom of the filter medium and arranged to receive and distribute supplies of water and air. The conduit has a cross section as shown in FIG. 1 comprising a generally circular pipe 1 provided with a horizontal internal wall 2 dividing the pipe into two superimposed ducts 3, 4. Apertures 5, 6 are provided along the top and bottom of the pipe 1.

Figure 2:
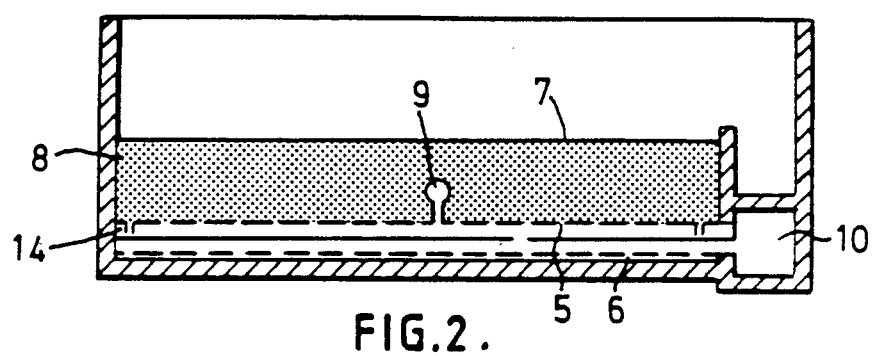
FIG. 2 represents a schematic sectional view of a filter.

A typical arrangement shown, in part, in FIG. 2 where the conduit 1 is disposed at the bottom of granular filter media 7 in a concrete enclosure 8. The upper duct 3 is connected to an air supply duct 9, arranged for supply of compressed air at an appropriate pressure. At the side of the enclosure 8 a water manifold connects with the lower duct 4 for the provision of water or, in reverse, for removal of filtrate.

Figures 3, 4:
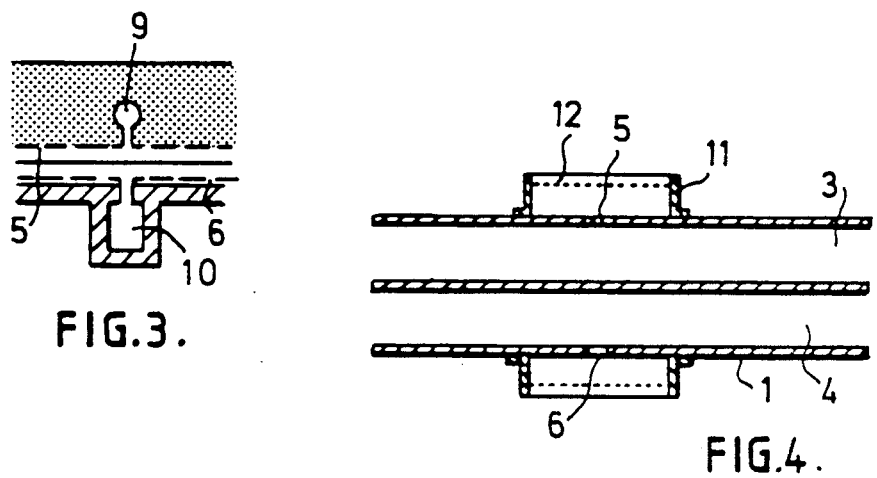
FIG. 3 shows a partial schematic sectional view of an alternative arrangement to that shown in FIG. 2.
FIG. 4 represents an axial section of part of the conduit with strainer means provided on apertures.

An alternative embodiment is shown in FIG. 3 where the air supply duct 9 and the water manifold 10 are superimposed at the centre of the enclosure. It will be appreciated that many other arrangements are possible.

No suspended floor or other elaborate support is required. The conduit 1 merely rests at the bottom of the closure 8, generally surrounded by the filter medium.

As shown in FIG. 4, the apertures 5, 6 can conveniently be surrounded by a collar 11 fitted with a mesh or perforated sheet 12, together comprising strainer means for preventing suspended particles from entering the ducts during filtration.

As well as the filter itself according to the invention, we also provide and underdrain system as defined above for use in a filter. We further provide an extruded conduit of the type defined above provided with axially spaced apertures.

Figures 1A, 1B, 1C:
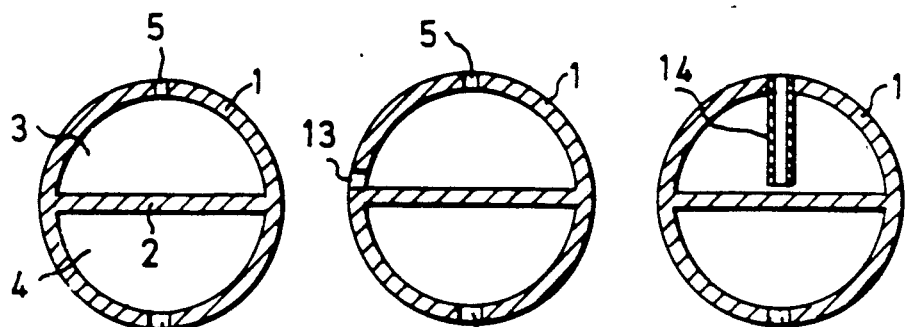
FIG. 1 represents sections through the conduit, 1A, 1B and 1C showing different embodiments.

In the example of FIG. 1B there are provided an auxiliary aperture or apertures (13) near the base of the air duct. If the pressure across the service apertures (5) is greater than the head of water between the service apertures and the secondary aperture then the secondary aperture will start to discharge air after the water level has stabilised. It is of course preferable that only one secondary aperture be employed, otherwise there may be uncertainty so to whether both discharge when the latter stage is reached. Alternatively is is possible to insert one or more downcomer stems (14) into the air duct (see FIG. 1C). Again, if the pressure loss across the air apertures is greater than the head of water in the stem, then the stem will blow clear of water once the water level has been depressed. Either way the service apertures remain clear and effective.

Figures 5A, 5B:
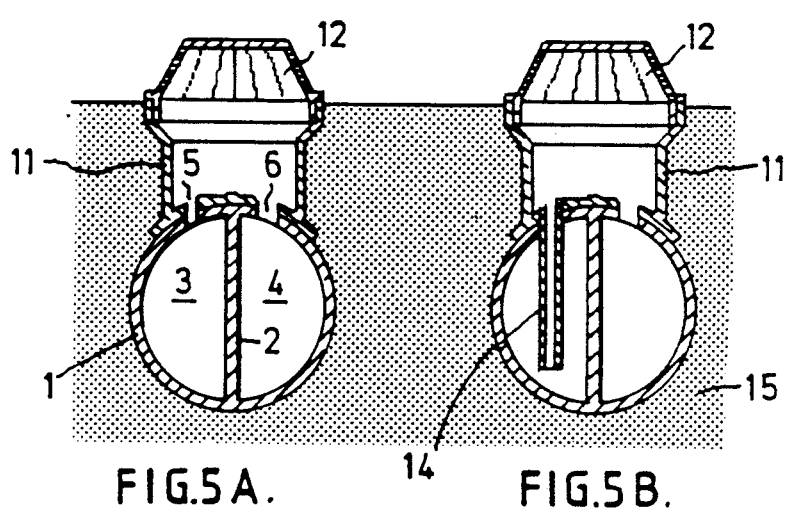
FIGS. 5A and 5B show two preferred embodiments in cross section, including a distribution collar.

A designer thus has the choice of making the secondary aperture fill the complement required to cover the floor or it may be a supernumerary one. The additional air flow is not normally of any concern if it is only one out of a considerable number on each lateral. This version has advantages if the lateral pipes are to be embedded in concrete and the discharge of backwash and colection of filtrate are to be from the top of the lateral pipe. FIG. 5 illustrates such an arrangement. In this case the dividing wall (2) is vertical and air and water apertures (5, 6) are both at the top and open into a distribution collar (11). The configuration facilitates casting in of infill concrete (15) to provide a hygenic filter floor on which there are no zones of media below the strainers which do not receive the combined or separate air scour. Such a floor therefore provides an upper surface identical to that of a suspended concrete floor, without the cost and depth of the normal underfloor plenum chanber.

I claim:

1. In a granular media filter including an underdrain system comprising perforated lateral conduits arranged for the distribution of air and water for scouring and backwashing of the filter, each conduit being in the form of a single linear conduit containing two or morw separate axially parallel ducts separated by one or more internal wall(s), the improvement consisting in that each duct has an external wall in common with its conduit, which external wall is provided with axially spaced apertures for emission of water or air, said axially spaced apertures located in an upper position in at least one of the ducts projecting downwards into the duct as an inwardly extended duct, and in that in each conduit at least one duct is arranged for the distribution of air and at least one duct is arranged for the distribution of water, there being no air and water intercommunication between the ducts.

2. The filter according to claim 1 in which the two or more separate ducts are located side-by-side with the internal wall(s) substantially vertical.

3. The filter of claim 2, in which the upper surface of each conduit is provided with upwardly extending supply collars, the apertures opening into said collars such that each collar can communicate with said two or more ducts whereby it can receive both air and water.

4. The filter system of claim 3, in which the underdrain system is encased in concrete to provide a filter floor from which the supply collars protrude.

5. The filter of claim 3 in which at least one of the apertures and the collars are provided with strainer means.

6. The filter of claim 1 in which the external wall of the duct for air distribution is provided with at least one additional aperture at a lower level than the said axially spaced apertures.

7. The filter of claim 1 in which each conduit is formed from a one piece extrusion.

8. The filter of claim 1 having conduits of generally circular cross section.

9. A method of supplying a combined air scour and water backwash to a granular media filter by incorporating therein and using an underdrain system comprising perforated lateral conduits arranged for the distribution of air and water for scouring and backwashing of the filter, each conduit being in the form of a single linear conduit containing two or more separate axially parallel ducts separated by one or more internal wall(s), the improvement consisting in that each duct has an external wall in common with its conduit, which external wall is provided with axially spaced apertures for emission of water or air, said axially spaced apertures located in an upper position in at least one of the ducts projecting downwards into the duct as an inwardly extended duct, and in that in each conduit at least one duct is arranged for the distribution of air and at least one duct is arranged for the distribution of water, there being no air and water intercommunication between the ducts.

* * * * *